March 26, 1935. G. L. POWNALL 1,995,686
APPARATUS FOR MAKING TABLE ICE
Filed Sept. 13, 1932  3 Sheets-Sheet 1
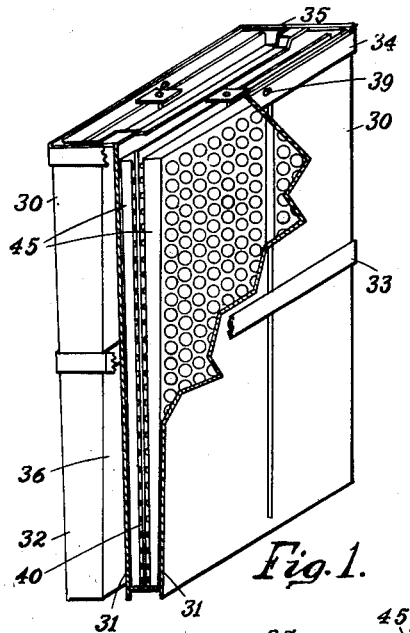
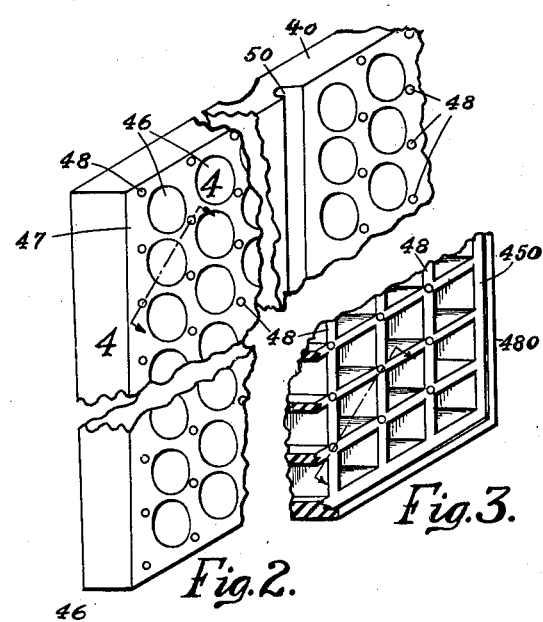
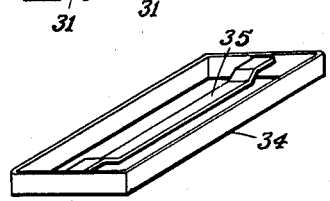
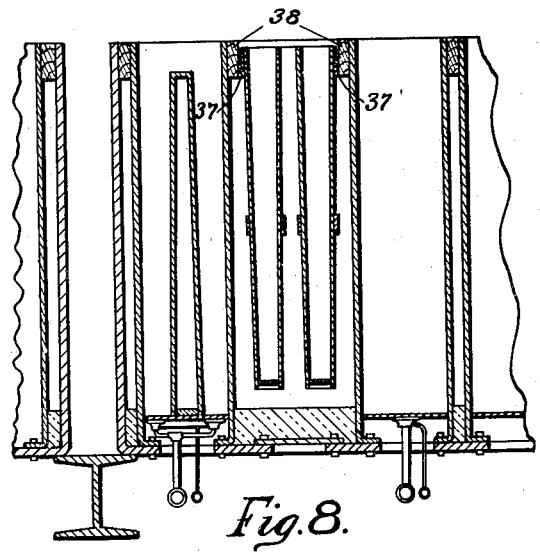
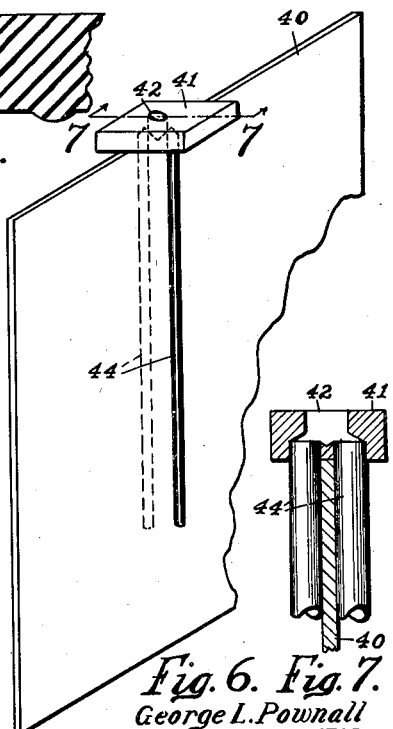
George L. Pownall
INVENTOR.
BY Murray and Zugelter
ATTORNEYS March 26, 1935. G. L. POWNALL 1,995,686
APPARATUS FOR MAKING TABLE ICE
Filed Sept. 13, 1932   3 Sheets-Sheet 2
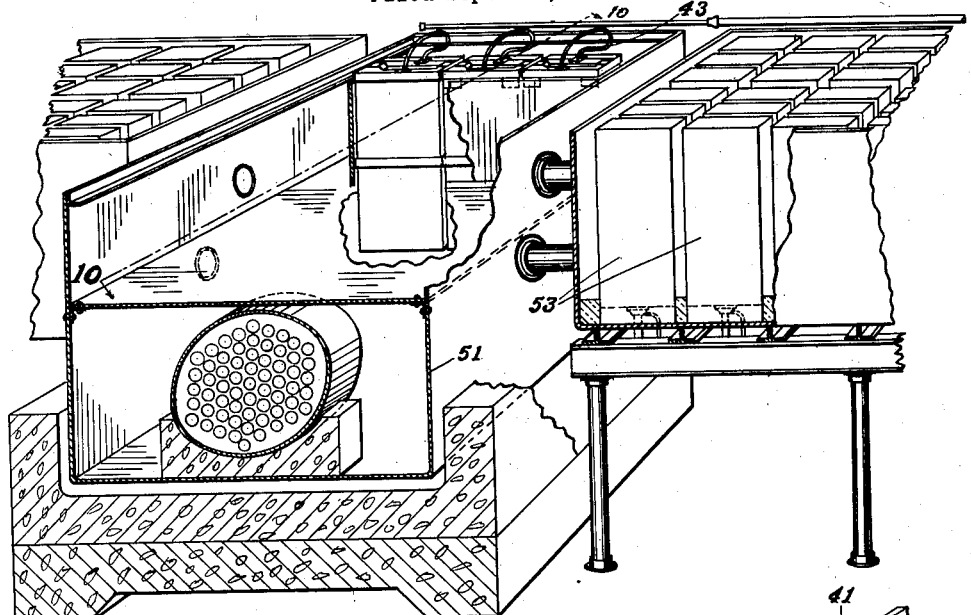
Fig. 9.
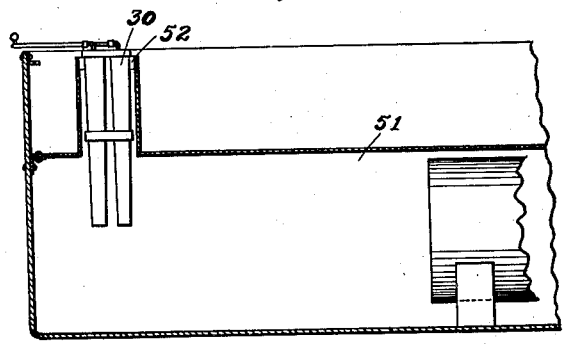
Fig. 10.
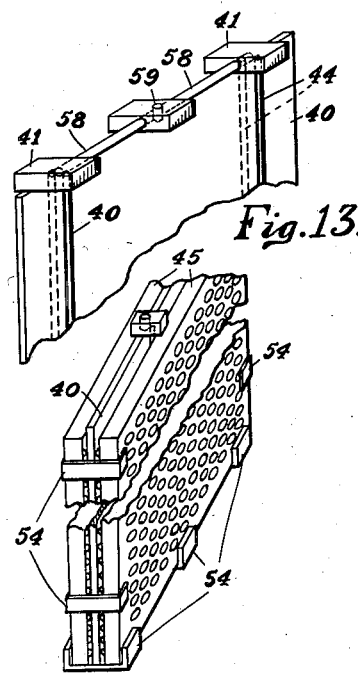
Fig. 13.
Fig. 14.
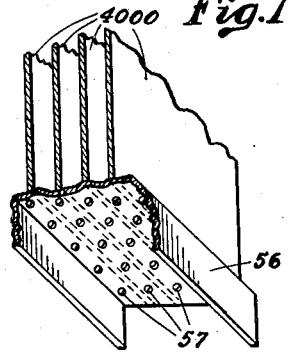
Fig. 11.
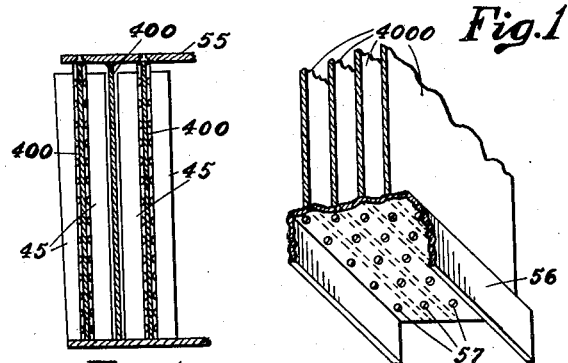
Fig. 12.
George L. Pownall
INVENTOR.
BY Murray and Zugelter
ATTORNEYS March 26, 1935. G. L. POWNALL 1,995,686
APPARATUS FOR MAKING TABLE ICE
Filed Sept. 13, 1932 3 Sheets-Sheet 3
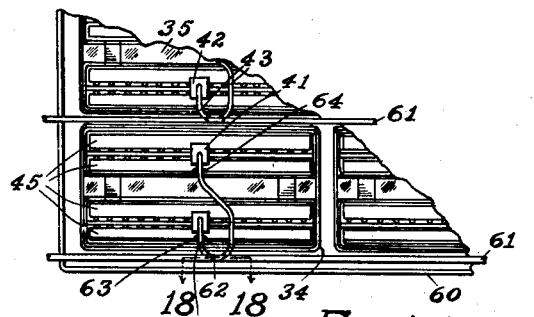
Fig.15.
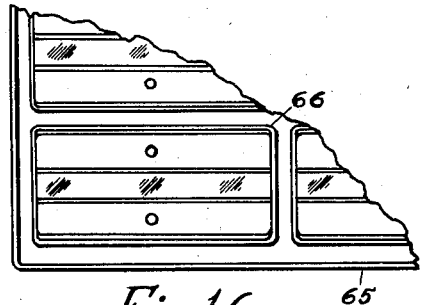
Fig.16.
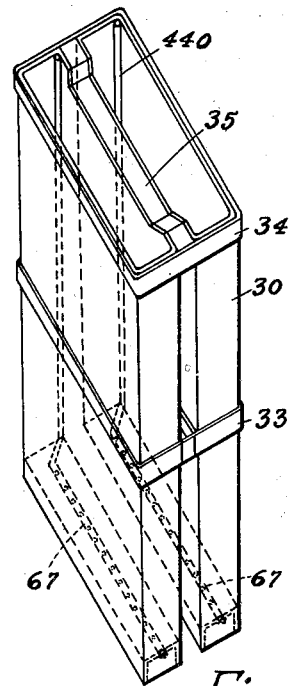
Fig.17.
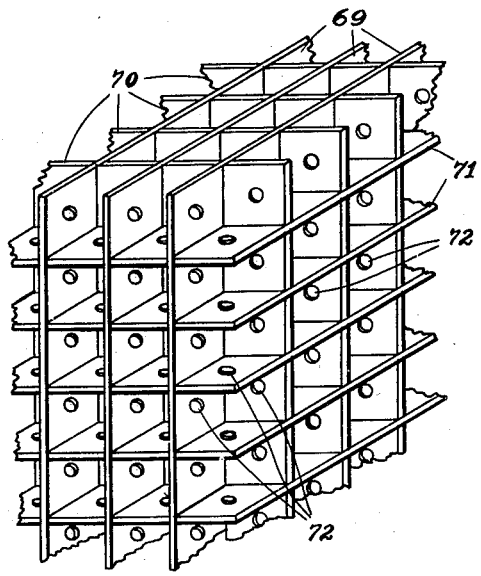
Fig.19.
Fig.20.
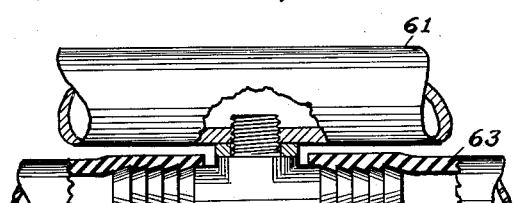
Fig.18.
George L. Pownall
INVENTOR.
BY Murray and Zugelter
ATTORNEYS Patented Mar. 26, 1935

1,995,686

UNITED STATES PATENT OFFICE 1,995,686

APPARATUS FOR MAKING TABLE ICE

George L. Pownall, Cincinnati, Ohio

Application September 13, 1932, Serial No. 632,924

21 Claims. (Cl. 62—108.5)

The present invention relates to an improved method and apparatus for producing commercially and in hotels and institutions small portions of ice such as cubes or small cylinders or rolls of clear artificial ice adapted for table use, as in the water tumbler and the like.

An object is to provide such small clear artificial ice cubes and ice rolls of cylinder shape with a mold or means which requires no cutting of the cubes or rolls before use.

Another object is to provide a means whereby opaque cylindrical shaped ice rolls may be formed and harvested without cutting.

Another object is to provide means for producing large numbers of such ice rolls and ice cubes joined by a very thin sheet of ice over one face so that they may be easily broken away from the sheet for separating the mass into individual rolls or cubes.

Another object of the invention consists in the provision of means of the kind described capable of producing the desired rolls or cubes of either clear or opaque ice in an unusually short period of time, e. g., harvesting each can of ice from four to six times per twenty-four hour day as compared with the present practiced method of freezing a solid cake of ice in about two twenty-four hour days and then cutting it into cubes by expensive and dangerous machinery.

Another object is to provide means which are simple, efficient, and readily installed and which are capable of producing ice rolls and ice cubes in both the stationary and removable can types of freezing tanks now in commercial use, and to further provide for freezing said rolls or cubes from the exterior toward a central plate and simultaneously moving impurities out of and above the mold where they are moved as a frozen or congealed mass exteriorly of the mold.

Another object is to provide means of this kind that are also adapted to the production of ice rolls and ice cubes in the heretofore unused brine cooling tank which is separated from the conventional ice freezing tanks.

The invention also comprises certain details of form and arrangement and combination of parts, all of which are hereinafter set forth in the description and shown in the accompanying drawings, in which:

Fig. 1 is a perspective view of an ice producing means of the invention, part being broken away and showing the roll or cylinder mold in position.

Fig. 2 is an enlarged fragmental perspective view of an ice roll forming mold or frame.

Fig. 3 is a fragmental perspective view of an ice cube forming frame or mold.

Fig. 4 is a cross sectional view taken on line 4—4 of Fig. 2 and showing also the superficial aspects of a section 4—4 on Fig. 3.

Fig. 5 is a perspective view of a top can band and division bar for the device shown in Fig. 1.

Fig. 6 is a fragmental perspective view of a separator plate showing the air tubes mounted thereon.

Fig. 7 is an enlarged sectional view taken on line 7—7 of Fig. 6.

Fig. 8 is a cross sectional view of a stationary can type of ice freezing tank showing two modified means of adapting the invention to the stationary can type of freezing tank.

Fig. 9 is a perspective view of a stationary can type of freezing tank installation in communication with a brine cooling tank, parts being broken away and showing the device of the invention adapted for use in the brine cooling tank while the conventional freezing tank is left to its intended use in the production of large ice cakes.

Fig. 10 is a view taken on line 10—10 of Fig. 9.

Fig. 11 is a sectional view of a modified form of separator plates and forming frames of the invention.

Fig. 12 is a fragmental perspective view showing the bottom of a modification of the form shown in Fig. 11.

Fig. 13 is a fragmental perspective view of a modified form of separator plate and air tubes forming a part of the invention.

Fig. 14 is a fragmental perspective view of a separator plate and a pair of forming frames showing a means of retaining the forming frames and plate in operative position.

Fig. 15 is a plan view showing the ice forming means of Fig. 1 adapted to a freezing tank.

Fig. 16 is a plan view showing a device of the invention adapted to the stationary can type of freezing tank.

Fig. 17 is a perspective view of the ice can of Fig. 1 with a modified means of adapting the air tubes thereto.

Fig. 18 is a view partly in cross section showing the air connection on line 18—18 of Fig. 15.

Fig. 19 is a perspective view showing a modified form of cube forming frame of the invention.

Fig. 20 is a perspective view showing a top can band and division bar as a modification of the structure shown in Fig. 5.

In order to provide a basis for a better understanding and appreciation of the advantages of the present invention over present day practice, the present day practice will be briefly outlined, as to the operations in producing ice cubes for table use in a commercial ice plant and in freezing tanks commonly found in hotels, hospitals, clubs, etc. Owners of domestic electric refrigerators frequently find that the capacity of the home refrigerator is not equal to requirements in producing sufficient quantities and quality of ice cubes, and ice manufacturers have been quick to install cutting machinery such as has all along been employed by hotels and caterers for sawing up the well known commercial three hundred pound block of ice into small cubes. This method is costly and wasteful, entailing fully forty per cent loss in broken ice, chips, ice sawdust, and highly imperfect cubes for which a separate market must be usually sought by the ice manufacturer. Considerable loss often acknowledged as twenty-five per cent is sustained even by the hotels where shaved and finely cracked ice may be employed in serving foods in chilled states. The commercial ice manufacturers and hotels employ an expensive special ice cube cutting machine comprising a plurality of vertical and horizontal circular saws, which is dangerous to operate and in numerous cases has resulted in personal injury to the operator and which consumes power to operate. On the basis of a unit of brine tank freezing space per unit of time it is possible, by means of the present invention, to increase the usable ice cube or ice roll out-put eight times; and in addition to save the cost of the ice cutting machine, also the cost of the power to operate the machine and of the labor of a man to operate the machine.

The means and method of the invention consist in placing sheet-like molds vertically in ice freezing cans which are preferably adapted to receive two of such molds with a plate of the invention interposed between them and carrying the necessary air bubbling tubes when it is desirable to produce crystal clear cubes or rolls for table use. It is to be understood that the method of production is adaptable to the rapid production of ice for any other use and that if desired this may be opaque ice, in which case the air bubbling tubes may be omitted.

The ice can of the invention is preferably made in twin unit cans in order to readily adapt it to use in existing stationary or removable can type freezing tanks. It will be understood, however, that the invention herein contemplates the use of single cans as well as more than two cans, if it should be desirable to install a freezing tank intended exclusively for freezing ice cubes and/or rolls of the invention, or if the present tank is of such size as to accommodate only a standard one hundred (100) or two hundred (200) pound can. For most commercial installations, however, it is preferable to use the above described twin unit which will fit into the commonly used stationary can space or may be used interchangeably with the ordinary removable ice can.

The cans 30 each have flat sides 31 spaced apart at the top a little more widely than at the bottom. End walls 32 are likewise tapered so that the mold frames with the ice frozen therein may be readily removed. Each can is preferably bound on all four sides transversely intermediate its top and bottom by a band 33 to preclude bulging of the side walls 31. This band 33 may be secured in any suitable manner such as by spot welding. A top can band 34 surrounds the outermost walls of the pair or group of cans and has a longitudinally extending support bar 35 which fits between each adjacent pair of walls 31. The cans 30 are therefore definitely positioned with an ample circulating space 36 between them in order to insure contact with the freezing brine on the four major faces of each can. The can in this form may be suspended, as shown at the center of Fig. 8, by resting the bottom edge of the top band 34 upon a suitable ledge 37 projecting from parallel stringers 38. Holes 39 in the can band are adapted to receive can hooks for handling the can and inserting it in and removing it from the freezing tank. Each of the cans 30 is adapted to removably receive a separator plate 40 which, when adapted to be used in the production of clear and transparent ice, preferably carries air bubbling means consisting in a top block 41 having an opening 42 to receive a flexible air tube 43 (see Figs. 9 and 15) in the top thereof or individual separate openings not shown and which has air tubes 44 disposed on opposite sides of the plate 40 and communicating with the opening 42 in said block. Each face of the separator plate 40 is adapted to receive a mold frame 45 preferably formed of molded rubber or other suitable flexible material. The mold 45 has a plurality of transverse spaced slightly tapering but substantially cylindrical holes 46 therethrough in which water is adapted to be frozen to form the ice rolls of cylindrical shape. On the inner face 47 of mold 45 are numerous protuberances or lugs 48 which uniformly space the face 47 slightly from the plate 40 when the parts are in operative position. A longitudinal groove 50 seats air tube 44 so that the air which is forced down through the tube may freely bubble through the narrow space between the plate and the mold and thus agitate the water during the freezing operation. As shown in Fig. 3, the mold may take a different form and be accommodated to other shapes of ice pieces, e. g., the formation of cubes of ice. In this form the mold 450 may have a marginal ledge 480 as well as the lugs 48. The taper of the can bodies and the lesser taper of the molds 45 and 450 is shown somewhat exaggerated in the drawings, while in reality this longitudinal taper is sufficient merely to enable easy removal of the ice and mold after the warm water immerson of the can. The length of the ice cylinders or ice cubes is for all practical purposes identical whether the cylinders or cubes be taken from the top or bottom portion of the mold.

In utilizing the can and mold structures as shown in Figs. 1, 2, and 3, the ice manufacturer would merely replace one or more of his ordinary removable ice cans with the units of the invention thus far described. With a brine temperature and circulation rate at which ice would be completed for harvest in the ordinary can in forty-eight hours, the manufacturer would be able to harvest the ice rolls or ice cubes in the device of the invention once every four hours.

The procedure in making ice is substantially that commonly known in the art, namely, filling the cans with water, inserting them in the freezing tank, coupling the air lines to the air bubbling tubes if clear ice is desired, and then upon completion of the freezing operation removing the can and dipping it into a thawing bath whereupon the separator plate, molds and the ice contained therein are withdrawn from the can as a unit. Since the protuberances 48 are very small, these cylinders or cubes of ice are connected together only by a very thin sheet of ice which is perforated at intervals by reason of the protuberances 48. After separation of the molds from the opposite sides of the separator plate, the cubes or cylinders are easily flexed or pushed out of the mold. These cubes or cylinders may then be forthwith packaged and placed in a low temperature storage until ready for delivery.

In hotels and other establishments that have their own ice making plant, it will be readily seen that at no hot weather period will an establishment with even a small ice plant be unable to produce an adequate supply of cubes or rolls. Furthermore, when there is a heavy requirement for ice cubes or ice rolls a greater number of ice cans and molds of the invention may be put into service, and at other times block ice may be frozen if considered desirable. The instant interchangeability of the cans of the invention with the existing equipment provides a most flexible arrangement for any manufacturer of ice who may have an outlet or use for ice cubes or cylinders. The rapidity with which the cubes or ice rolls are frozen enables a manufacturer to allot a relatively small number of can spaces to the devices of the invention for the production of ice cylinders, or ice cubes, in amounts sufficient for normal requirements.

In Fig. 9 there is shown the general arrangement of a stationary can ice plant including a brine cooling tank 51 having an overflow or surge section 52 into which the can units 30, for example as shown in Fig. 1, may be placed thus utilizing for ice freezing a space which was heretofore unused for that purpose. By this arrangement it is possible for the manufacturer to add equipment of the invention for making clear artificial ice cubes or clear artificial ice rolls without reducing the capacity of his stationary can ice block freezing equipment. The stationary cans 53, however, are readily adaptable to receive molds of the invention for the production of ice cylinders or rolls or ice cubes. Such an arrangement is shown in Fig. 14 wherein the usual molds 45 and separator plate 40 are held together at the sides and bottoms by U-shaped clips 54 to provide units that can be lowered into the cans whereupon the usual filling of the cans from the bottom as well as the bubbling of air if desired, may be carried on, after which the freezing process is rapidly completed and the plate and molds removed so that the ice cylinders or cubes can be harvested.

If desired a relatively large number of separator plates 400 may be attached to a top member 55 and the molds 45 associated therewith in pairs on alternate plates in a larger can. In Fig. 12 these same plates indicated at 4000 are secured to or made integral with U-shaped bottoming plates 56 having perforations 57 in order to attach this form to stationary types of cans.

If desired, and particularly for embodiments that are wider than the ordinary ice can, the separator plate 40 may be made wider and may be provided with several pairs of air bubbling tubes 44, the blocks 41 which support the tubes being connected by pipes 58 having a common air intake arrangement 59.

In Fig. 15 there is shown a fragment of an ordinary ice freezing tank 60 with a preferred form of the cube and/or roll freezing cans in position. The air lines 61 extend longitudinally between the rows of cans and are provided at intervals with T-connections 62 to which the flexible tubes 63 are attached for supplying the air to the center of blocks 41.

In Fig. 16 there is shown a freezing tank 65 with stationary ice cans 66 having the device of the invention placed therein for freezing ice rolls or cubes.

In Fig. 17 there is shown the removable type of can of the present invention modified by building the air bubbling tubes into the can instead of attaching it to the separator plate. In this instance the air tubes 440 may extend along one longitudinal corner of each compartment of the can and then downwardly across the center of the bottom, as at 67, in the form of a perforated pipe. A separator plate without the air tubes and molds are used similar to those shown in Figs. 2 and 3 save that the groove 50 is not used and one longitudinal outer corner is cut away to accommodate pipe 440 in the can. As shown in Fig. 20, the top can band 34 may be made of angle iron so as to provide a spacing flange 68 constituted by one leg of the angle iron. The spacing flange 68 cooperates with the edges of similar flanges on adjacent cans to assure sufficient and uniform brine circulating channels between the can units or groups.

The structure shown in Fig. 19 is intended for insertion in the ordinary standard removable ice can and consists of a plurality of intersecting vertical strips or plates which are in turn interlocked with spaced horizontal plates or strips. The long vertical strips or sheets 69 and the shorter ones 70 may interlock somewhat after the fashion of the old and well known egg crate separators and the horizontal plates 71 cooperate therewith in like manner. This forms a plurality of intersecting partitions providing hollow molds for ice cubes. In each wall of each mold is an aperture or perforation 72 affording communication in each direction with adjacent mold spaces. This allows for the bubbling of agitating air through a body of water in the ordinary ice can during the freezing operation so that a multiplicity of clear ice cubes may be formed and connected only by the very tiny lugs occasioned by perforation 72. In removing the ice cubes after freezing with the device in this form, the usual thawing bath conditions the standard ice can (not shown) for the removal of the molding frame 73 and the cubes therein as a unit. The plates or strips may then be pulled apart and the ice cubes freed therefrom.

The method of freezing the small portions of clear transparent ice consists essentially in freezing each individual portion from the exterior of the can toward the center, where the removable dividing plate serves to direct the flow of water with the impurities thrown out from the frozen portion upwardly. The pressure of the agitating air is of sufficient strength to have the circulating water to flow over the tops of the molds from the beginning of the operation. This results in progressively building up from the top of the mold and the side of the can a strip of congealed impure ice which is entirely separate from the ice cubes or ice rolls to be used.

Substantially this same segregation of impurities on the top of the mold takes place in the use of the mold frame shown in Fig. 19. With this form there is also employed agitating air of sufficient pressure to similarly build up a flow of the unfrozen water onto the top of the mold with results as previously explained. This is made possible by having the perforations 72 so arranged on every face of the mold frame as to provide an outlet for circulation of the unfrozen remainder which will act to carry off and segregate the impurities.

The cylindrical ice roll as formed by the mold in Fig. 2 is particularly novel and advantageous in itself since, in addition to its ornamental appearance due to its suggestion of a conformity, in the diminutive, to the general shape of water tumblers, these ice rolls do not have the tendency to tipping forwardly onto the upper lip of the user when draining a glass of water iced with the rolls. Experience shows that a glass of water with angular or cubical ice pieces therein usually causes the drinker to quite unconsciously separate and distort his lips to hold the floating ice cubes back. With the ice rolls of the invention the user can comfortably sip the beverage from the glass without this annoyance.

Cylindrical table ice for the drinking glass is capable of production in a domestic mechanical refrigerator in which a small section of mold, as shown in Fig. 3 is placed in the usual pan to be subject to freezing in the chilling coils in the well known manner. The small section of mold is not illustrated since its arrangement flatwise in the usual pan is clearly understandable.

Reference is made to my copending applications Serial No. 588,175 filed January 22, 1932, allowed August 8, 1934; and Serial No. 632,923 filed September 13, 1932, allowed July 18, 1934.

What is claimed is:

1. As a new article of manufacture a vertical mold for producing ice cylinders in an ice can in a refrigerating system comprising a thick sheet of material having a multiplicity of cylindrical bores therethrough in the direction of the thickness of said sheet said sheet being flexible but self sustaining when supported on its edge in an ice can.

2. In a means for producing small ice portions in a refrigerating system the combination of a mold means having transversely disposed and suitably shaped apertures therein, a plate member adapted to abut said mold means on one side, lugs slightly spacing said mold means and plate and a can having an internal space thickness to slidably receive the plate and mold means.

3. In an apparatus for freezing a multiplicity of clear table ice portions in circulating liquid refrigerant tanks the combination of a freezing can, a removable plate for dividing the can into two chambers, transversely apertured flexible mold forms each having spacing members on one face thereof, the molds being slidable one each in the chambers with the spacing members abutting said plate and means to introduce agitating air to the lower portion of each chamber whereby a flow of water to be frozen is maintained along each face of the plate upwardly to the tops of the molds for moving impurities above the molds.

4. An apparatus for producing table ice portions in circulating liquid refrigerant circulating tanks and the like comprising a can of internal space thickness slightly in excess of the length of two of the desired ice portions, a pair of flexible ice molds disposed vertically in said can, a central dividing plate disposed between the molds, means to slightly space the plate from adjacent faces of the molds and means to introduce water agitating medium in the lower portion of the can on opposite sides of the plate where the freezing water is caused to flow upwardly along the plate onto the top of the mold whereby impurities are congealed during the freezing operation in isolated relation to the water freezing in the mold spaces.

5. As a new article of manufacture a mold for the production of ice cylinders in circulating brine systems comprising a thick sheet of flexible material having slightly tapering cylindrical bores therethrough in the direction of the thickness of the sheet.

6. In a device of the class described the combination of flexible molds having horizontally extending mold spaces therethrough, means to contain water to be frozen and adapted to receive a pair of said molds whereby said water is frozen inwardly from one face of each mold, a divider plate between the molds and slightly spaced therefrom and means to introduce agitating air on each side of said plate whereby the water to be frozen may circulate upwardly on opposite faces of the plate to carry impurities to the exterior top of the molds for congelation there.

7. In a device of the class described a pair of flexible members having ice mold spaces therein and a longitudinal way in one face of each member, a dividing plate between said members and air bubbling tubes mounted on opposite sides of the plate and seating in the ways therein.

8. In an apparatus for producing small ice portions the combination with an ice freezing can, of a pair of molds each of a thickness of the length of the desired ice portions and having apertures transversely thereof conforming to the desired cross section of said ice portions, a separator plate, air tubes mounted one on each side of said plate, one face of each mold being grooved to seat one of said tubes, means to slightly space the said plate from said grooved face of said molds, means to hold said molds and plate together and means to connect said tubes to an air supply line.

9. In an apparatus of the class described the combination of a stationary type ice can, means dividing said can into a plurality of relatively thin, wide vertical chambers, removable vertical mold sheets for each of said chambers, said mold sheets having transverse apertures therein for shaping substantially independent small ice portions, and means to introduce agitating air into the chambers during the freezing operation.

10. As a new article of manufacture a thick flexible sheet transversely apertured from one major face to the other major face and having a multiplicity of spacing lugs on one face intermediate the apertures.

11. As a new article of manufacture a vertical molding form for producing a plurality of small ice portions in an ice freezing can, said form comprising a thick transversely perforated flexible sheet having spacing means on a face thereof.

12. Apparatus for making small ice portions of cylindrical shape for table use comprising a freezing can for use with a refrigerating system, and a slab-like mold member removably disposed therein and having cylindrical apertures therein, said mold member being vertically supported on its edge in said can.

13. In a means for producing small ice portions in a refrigerating system the combination of an ice can and a mold having transversely disposed cylindrical shaped apertures therein and means to agitate the liquid to be frozen during the freezing operation.

14. In a means for producing small ice portions in a refrigerating system the combination of an ice can and a mold having transversely disposed cylindrical shaped apertures therethrough and means to agitate the liquid to be frozen during the freezing operation.

15. As a new article of manufcture a mold for the production of ice cylinders for the drinking glass in refrigerating systems comprising a thick sheet of flexible material having slightly tapering cylindrical bores therethrough in the direction of the thickness of the sheet said mold being self sustaining when seated on an edge thereof that is in substantial parallelism with the axes of the bores.

16. In a means for producing small ice portions in a refrigerating system the combination of a vertical ice can and a vertical mold loosely mounted therein having transversely disposed cube shaped apertures therein and means to agitate the liquid to be frozen during the freezing operation.

17. In a means for producing small ice portions in a refrigerating system the combination of a vertical ice can and a vertical mold loosely mounted therein having transversely disposed cube shaped apertures therethrough and means to agitate the liquid to be frozen during the freezing operation.

18. In an apparatus for freezing a multiplicity of clear ice portions in circulating liquid refrigerating tanks, the combination of a freezing can, a removable plate for dividing the can into two chambers, transversely apertured mold forms, the molds being slidable one each in the chambers and means to agitate the water to be frozen during the freezing operation.

19. The combination with a stationary ice can, of a mold support comprising an inverted U-shaped bottoming plate having perforations therein, spaced vertical plates extending upwardly therefrom and slab-like mold members having transverse apertures therethrough and disposed one on each side of each of said spaced plates, the U-shaped member and vertical plates forming a unit whereby the vertical molds are removable simultaneously from the stationary can.

20. Apparatus for making small ice portions for table use comprising a freezing can for use with refrigerating system and a slab-like mold member removably disposed therein and having apertures therein, said mold member being vertically supported on its edge in said can.

21. Apparatus for making small ice portions of cubical shape for table use comprising a freezing can for use with a refrigerating system, and a slab-like mold removably disposed therein and having cubical apertures therein, said member being vertically supported on its edge in said can.

GEORGE L. POWNALL.